July 2, 1963 S. J. RADOV 3,095,575
WELDER'S HOOD
Filed June 14, 1960 2 Sheets-Sheet 1
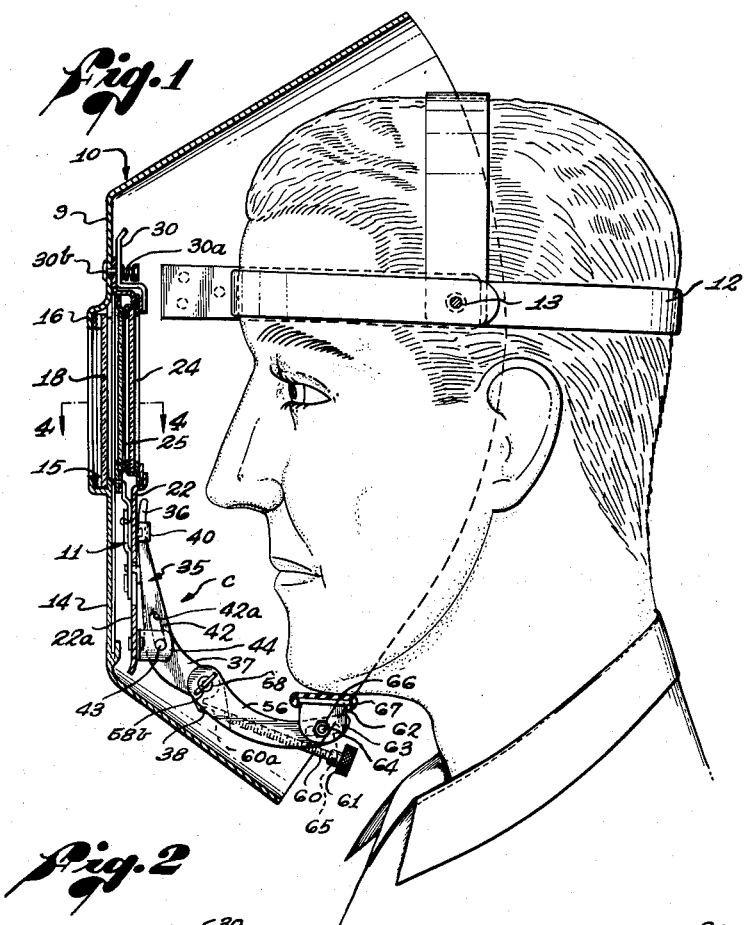
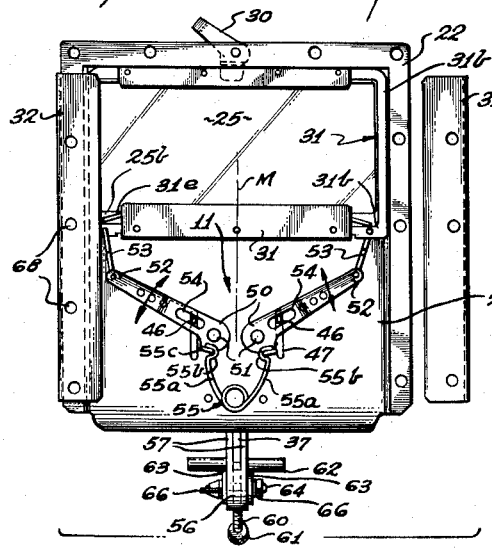
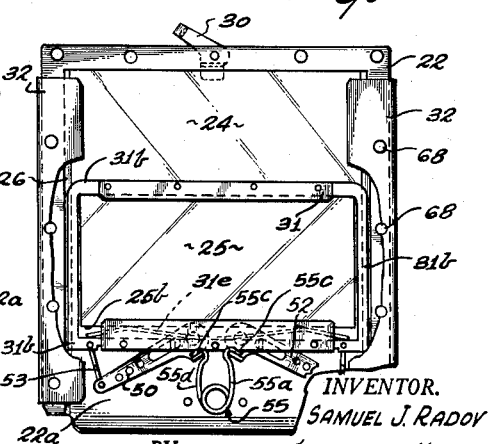
INVENTOR.
SAMUEL J. RADOV
Attorneys July 2, 1963
S. J. RADOV
3,095,575
WELDER'S HOOD
Filed June 14, 1960
2 Sheets-Sheet 2
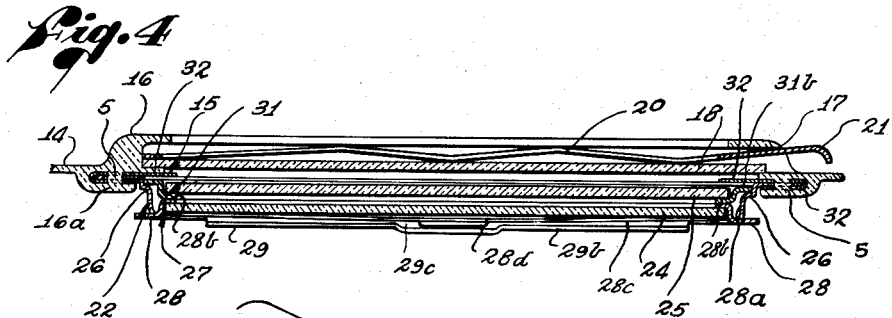
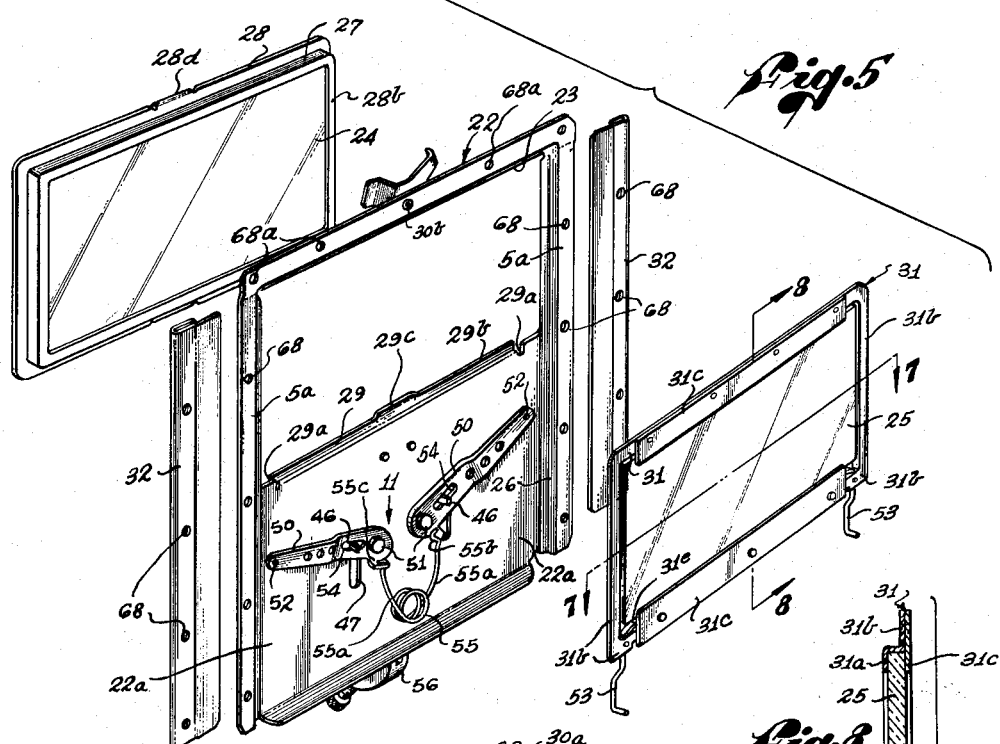
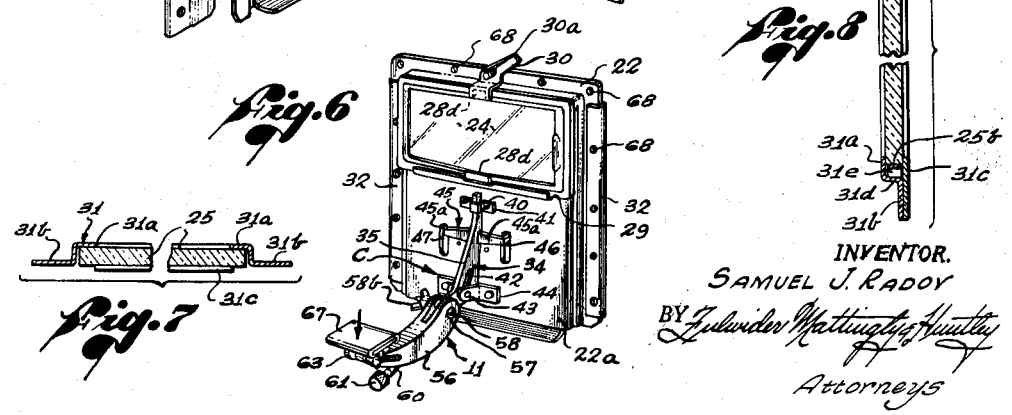
INVENTOR.
SAMUEL J. RADOV
BY
Attorneys

United States Patent Office 3,095,575
Patented July 2, 1963

3,095,575
WELDER'S HOOD

Samuel J. Radov, Los Angeles, Calif., assignor to
David F. Krumme, Jr., El Monte, Calif.
Filed June 14, 1960, Ser. No. 35,997
5 Claims. (Cl. 2—8)

This invention relates to welders' hoods and more particularly to an improved welder's hood embodying a novel chin-actuated mechanism for moving a welding lens into and out of a welder's direct line of vision; the term "lens" being used in the sense, frequently adopted in this art, of a light transmissive element, whether the optical surfaces be curved or flat.

Hoods have been worn by welders for many years to protect their eyes from the brilliant light emitted during welding operations and also to protect their faces from flying sparks and hot metal fragments. Originally, hoods were provided with fixed welding lenses arranged in the welder's line of vision. The lenses were in the nature of relatively high-power filtering elements, usually translucent or dark glass, of a nature to filter out the harmful rays of the brilliant welding light. Thus, the welder could safely view the welding operation.

The filter lenses of these prior hoods, however, so greatly impaired the welder's vision under normal lighting conditions as to require him to raise his hood, when performing such tasks as striking an arc in electric welding, inspecting the work, and removing slag from the weld. This procedure of continually raising and lowering the hood was not only time consuming, but also potentially dangerous. When the hood was raised and an electric arc was struck, the welder's eyes were exposed for a short period of time before the hood could again be lowered. Also, in situations where several welders were working side by side, flash burns to the eyes were frequent when a welder had his hood raised and inadvertently looked at a nearby welding operation. In addition, both hands are normally required for the welding operation and, hence, the hood had to be raised and lowered while either continuing to hold the work or after freeing one hand. If one hand was freed by releasing the work, it was then necessary to pick up the work under the conditions of poor visibility, and, in either case, accidents resulting in burns or other injuries were frequent.

These problems were partially solved in recent years when chin-actuated mechanisms of various types were mounted on the hoods for alternately moving a shiftable filter lens into and out of the welder's line of vision. This improvement obviated the necessity of using the hands to raise and lower the hood. A further improvement was made when a stationary, transparent lens was used in addition to the filter lens. The function of this additional lens was to protect the face and eyes from dirt, grit, and the like, when the welding lens has been retracted from the line of vision to obtain increased visibility, and also, in cases where the transparent lens was outermost, to protect the filter lens from flying sparks during the actual welding.

It is clearly evident that mechanisms of this type are highly beneficial from the safety standpoint and also from the standpoint of improving the efficiency of the welding operation. However, such mechanisms have, in the past, met with some difficulties in that they were frequently either unreliable in operation or too complicated to be practical. Also in the past, no protection was provided for the eyes against flash burns during periods when the welding lens was removed from the line of vision and the welder struck an electric arc or inadvertently looked at a neighboring welding operation.

It is, therefore, an object of this invention to provide an improved welder's hood embodying a novel chin-actuated, lens shifting mechanism characterized by improved operability and increased reliability in moving a welding lens into and out of the welder's line of vision.

Another object of this invention is to provide a novel chin-actuated mechanism of the type described, which is simple in construction and embodies relatively few moving parts, most of which are protectively enclosed, yet which is entirely satisfactory in the service for which it is intended.

A further object of this invention is to provide a chin-actuated lens shifting mechanism which embodies a novel and highly advantageous displacement multiplier, whereby a given movement of the chin to actuate the device results in a proportionately greater movement of the welding lens.

A still further object of this invention is to provide an improved welder's hood which, when the relatively high-power filter lens is out of the welder's line of vision, will sufficiently protect the welder's eyes against the dangers of arc-striking and inadvertent observation of neighboring welding operations, all without seriously impairing visibility under the then-prevailing lighting conditions. Further, the auxiliary lens used for this purpose, contributes to the filtering effect during periods of welding, and the power of the main filtering lens may be reduced accordingly.

These and other objects and advantages of this invention will be better understood by referring to the following detailed description taken in conjunction with the accompanying drawings in which:

FIGURE 1 is a vertical, substantially medial, sectional view of the improved welder's hood of the invention, in place on the head;

FIGURE 2 is a detached elevation of the novel chin-actuated mechanism, as viewed from the left of FIGURE 1, with a shiftable filter lens shown in the position it occupies when it is in the direct line of vision of the welder;

FIGURE 3 is a view similar to FIGURE 2 but with the filter lens shifted towards an opposite position, certain parts of the mechanism being omitted and other parts being broken away to show underlying parts;

FIGURE 4 is an enlarged, fragmentary section on line 4—4 of FIGURE 1; the view being rotated 90° from the aspect of FIGURE 1;

FIGURE 5 is an exploded perspective of the mechanism shown in FIGURE 2;

FIGURE 6 is an assembly perspective of the mechanism shown in FIGURE 2;

FIGURE 7 is a contracted section on a slightly enlarged scale taken on the line 7—7 of FIGURE 5; and FIGURE 8 is a contracted section on a slightly enlarged scale taken on the line 8—8 of FIGURE 5.

With reference to the drawings and in particular to FIGURE 1, numeral 10 designates a welder's hood embodying the invention, including a novel, chin-actuated, lens-shifting mechanism 11 mounted on a shield 9 in a manner to be described. A usual head harness 12, which is preferably adjustable to accommodate different head sizes and profiles, supports the shield 9 for pivotal movement about the axis 13, in the usual manner. Shield 9 may be formed of any suitable rigid, opaque material such as fiber glass.

In the presently preferred embodiment, the shield 9 is formed with a flattened front portion 14 upon which the mechanism 11 is mounted and which is provided with a viewing aperture 15, located in the welder's line of vision. Raised flanges 16 are formed on the outer face of portion 14 and around the periphery of the aperture 15, as seen in FIGURES 1 and 4. One of the vertical flanges is slotted, as at 17, for the reception of a transparent plate or lens 18, typically formed of clear glass or plastic. The external, transparent plate 18 fills the aperture 15 and thereby functions to protect certain more expensive interior lenses, to be later described, from pitting or scratching. A frame-like, "wrinkled" spring 20 engages the marginal portion of plate 18 and the inside surfaces of flanges 16 yieldingly to urge the plate 18 against the front portion 14 of the shield 9, thus preventing the plate 18 from rattling or accidentally sliding out through the slot 17. When it becomes necessary to replace the plate 18 because of excessive pitting or scratching, the spring 20 is withdrawn by pulling on the exposed spring-tab 21, whereupon the plate 18 may be freely withdrawn through the slot 17.

The chin-actuated mechanism 11 is supported by a frame 22 which is mounted, as hereinafter described, on the inner face of the front portion 14 of the shield 9. The upper portion of frame 22 defines the top and sides of an aperture 23, while a plate 22a, fixed to the lower portion of the frame, defines the bottom of aperture 23. Aperture 23 is preferably of the same size and shape as aperture 15. When the frame 22 is mounted on the shield 9, the apertures 15 and 23 are in registration. The mechanism 11 is secured to plate 22a in the manner hereinafter described.

An auxiliary or safety welding lens 24, of relatively low filtering power, is stationarily mounted in aperture 23 of shield 9 during all periods of hood-use, though it is removable for substitution of another lens between periods of hood-use. On the other hand, a main welding lens 25 of relatively high filtering power, is vertically slidable, through frame guideways 26, between an uppermost position (as shown in FIGS. 1 and 2) where it is registered with aperture 23 and hence with lenses 18 and 24, to a lowermost position (FIG. 3).

The main filtering lens 25 may be relatively dark, while auxiliary filtering lens 24, for most purposes, may be merely tinted. The degree of filtering power of lens 24 is normally only that sufficient to protect the eyes from the flashes of arc-striking or from the light of neighboring welding operations, and therefore is of a relative density which does not seriously interfere with the welder's vision under normal lighting conditions when the movable lens 25 is "open"; that is, in the position of FIGURE 3.

On the other hand, the relatively dark main filtering lens 25 is normally of sufficient filtering power, by itself, to protect the eyes from the light rays emanating from immediately-close welding operations, though, with the use of the stationary auxiliary filtering lens 24, it is possible to reduce the filtering power of lens 25, since the welder has the filtering benefit of both lenses 24 and 25 when lens 25 is in the welding position of FIGURES 1 and 2.

The lens 24 is preferably made of "safety" glass so, even if a metal fragment should break through the plate 18 while lens 25 is open, the face and eyes of the welder are protected.

Auxiliary filter lens 24 is removably supported in aperture 23 through the medium of a rectangular frame 27 which has an outer marginal flange 28 adapted to engage the opposed edges 28a of the frame 22. Lens 24 is resiliently held against the in-turned marginal flange 28b of the frame 27 by a rectangular retainer 28c made of thin spring-steel, for instance. The horizontal arms of the retainer 28c are bowed, as shown in FIGURE 5, and are centrally held in compression by tabs 28d which are bent inwardly from the horizontal extents of flange 28.

Frame 27 rests on a horizontal ledge 29 formed at the top of plate 22a by cutting the upper edge of said plate at 29a and bending the material at 90°. The cut material is then bent upwardly again to form an offset vertical flange 29b against which rests the inner face of the lower member of frame 27. The flange 29b is pressed back to form a pocket 29c to receive the lower tab 28d on lens frame 27. A clip 30, spring-loaded at 30a (FIG. 1), is pivoted at 30b to frame 22, and, in its operative position of FIGURE 1 serves releasably to hold frame 27 and its associated lens 24 in operative assembly with frame 22.

The main filter lens 25 is supported in a carrier 31 (FIGS. 5, 7 and 8) here shown as a rectangular frame, having an inturned marginal flange 31a and an out-turned marginal flange 31b. The lens 25 is held between the flange 31a and the strips 31c riveted to the upper and lower extents of flange 31b. The lower edge 25b of lens 25 is spaced above the lower, horizontal extent of the web 31d (FIG. 7) of frame 31, and a bow spring 31e is interposed between the edge 25b and web 31d to provide a vertically resilient mounting for the lens 25, to absorb shock arising from a sudden checking of carrier descent.

The vertical extents of flanges 31b ride in the aforementioned guideways 26, being confined therein by an opposed pair of rolled flanges 32 secured to the vertical extents of the frame 22.

It will be seen that the lens carrier 31 is mounted for vertical reciprocation with respect to the frame 22 (and hence to the front wall portion 14 of the shield) from the position of FIGURE 2 to that of FIGURE 3, and reverse.

FIGURES 2 and 5 illustrate the means for holding the carrier 31 and its main filter lens 25 yieldably in the positions of FIGURES 1 and 2; that is, in the positions where lens 25 is in registry with the aperture 23, the lens 18 and the lens 24, the hood thus being in readiness for directly viewing welding operations.

A pair of levers 50 are pivotally connected to stationary plate 22a as at 51, the pivot pins 51 being in horizontal alignment and equally spaced from the median plane M. Thus, the proximal ends of the levers 50 are adjacent one another. The distal ends 52 of the levers 50 are pivotally connected by links 53 with the lower horizontal extent of flange 31b of the carrier frame 31.

A "floating" coil or torsion spring 55 has arms 55a whose termini 55b are hooked around the offet lugs 55c on the proximal ends of the levers 50. The inherent tendency of the spring 55 is to spread arms 55a apart, thus reacting on the lugs 55c in a manner tending to swing the levers 50 through equal angles in the directions of the arrows in FIGURE 2. Spring 55 thus acts, through levers 50 and links 52, yieldably to hold the carrier 31 and the main filter lens 25 in their uppermost positions, as in FIGURE 2.

The levers 50 are provided with longitudinally extending slots 54 which are located intermediate the proximal and distal ends of each, but are much closer to the proximal ends than to the distal ends. Their function will be later set forth.

FIGURES 1 and 6 illustrate the chin-operated actuator C whereby the operator causes the descent of carrier 31 from the position of FIGURE 2 to that of FIGURE 3, against the action of spring 55; and whereby the subsequent ascent of said carrier is controlled. While the actuator C is made up of a number of connected elements, as will appear, after it has been adjusted to a given head it may be considered as operating as a single integral unit mounted on shield 9 for bodily vertical reciprocation. In line with this consideration, the actuator C may be considered as a generally arcuate arm mounted on the stationary plate 22a for bodily vertical reciprocation, and operatively connected to the mechanism 11.

Actuator C includes a slide member 34 having, as viewed in FIGURE 1, a substantially triangular body portion 35, terminating at its upper end in a narrowed neck 36 which is slightly arcuate, and, at its lower end in an arcuate portion 37 which is provided, at its free end, with a radial shoulder 38 facing generally toward the chin of the wearer.

The neck 36 of the slide member 34 is guided for vertical movement by stirrup clip 40, which is riveted to plate 22a, the clip 40 also limiting the extent of horizontal displacement of neck 36 to the right, as viewed in FIGURE 1.

The body portion 35 of the slide member 34 is provided with a substantially vertical slot 42, though preferably it inclines or curves slightly with respect to the plate 22a, for reasons to be given later. A pin or roller 43 extends through the slot 42 and is end supported by brackets 44, which are riveted to plate 22a.

At a point between the clip 40 and the slot 42, the slide member 34 is provided with a cross head 45, whose arms 45a are of equal length and terminate in right-angular, pull-down claws 46; the latter extending through vertical slots 47 in plate 22a and into the lost-motion slots 54 of the levers 50. The clip 40 and the pin-an-slot connection 43, 42 are such as to maintain effective claw engagement with the levers 50 throughout vertical reciprocation and any slight lateral movement of slide member 34.

The spring 55 is sufficiently strong that it is effective normally both to support the carrier 31 in the position of FIGURE 2 and to offset the weight of actuator C, which weight is, through the claws 46, imposed, at least in part, on that carrier and hence tends to depress the carrier. In fact, when the actuator C is relieved of chin-pressure after the carrier 31 has been moved to the position of FIGURE 3, the spring 55, acting through the levers 50 and claws 46, is of an effective strength sufficient to elevate the actuator C to the position of FIGURE 1.

The actuator C includes an arcuate, lateral extension 56 pivotally connected at 58 with the otherwise free end of the portion 37 of the slide member 34. The end of the extension 56 may be forked, as at 57 in FIGURE 2, to receive the end of the slide-member portion 37 as a tongue, and the pivot 58 may be represented by a bolt passing through the fork and tongue. Threaded through the extension 56 is a "tangential" adjusting screw 60 having a knurled head 61, the opposite end 60a of said screw engaging the radial shoulder 38 on the curved portion 37 of the slide member 34. By reversely rotating the screw 60, the extension 56 is swung reversely about the pivot 58 to adjust the free end of the extension 56 vertically to fit a given head-configuration. The engagement of the screw 60 with the shoulder 38 prevents pivotal movement of the extension 56, with respect to the member 35, in a clockwise direction, as viewed in FIGURE 1, when the chin is subsequently lowered, so the members 34, 56 move downwardly as though they were made up an integral unit.

A chin plate 62 having laterally spaced, depending flanges 63, is mounted on the free end of the extension 56 with the flanges 63 engaging the opposite sides of said extension. A bolt 64 supported by and extending between the flanges 63, also extends through a substantially horizontal slot 65 in the extension 56. The slot 65 allows forward, rearward, and tilting adjustment of the chin plate 62 relative to the extension 56. After the chin plate 62 has been adjusted to the relative position correct for a given individual, a nut 66 is screwed down on bolt 64 to force the flanges 63 into forceful engagement with the extension 56, thus releasably retaining the plate 62 in this position of adjustment.

A cap 67, preferably formed of rubber or a similar material is snap-fitted on the chin plate to provide a cushion for the welder's chin. The cap is readily detachable so that it can be easily replaced when it becomes soiled or worn.

In use, the harness 12 is adjusted to a comfortable position on the welder's head. The nut 66 is then backed off to free chin plate 62 for tilting about the axis of bolt 64 and for movement forwardly and rearwardly within the limits of slot 65 in the extension 56. Normally, the chin plate 62 is then adjusted to the desired elevation by advancing or retracting the screw 60 in the chin extension 56. The desired position of the chin plate 62 relative to the chin varies, of course, from welder to welder. However, it is generally agreed that it is desirable to center the plate 62 vertically below the jaw bone in the front of the chin and to provide a small vertical clearance between the chin and the plate, thus allowing for small movements of the chin, as in talking or chewing, without actuating the lens shifting mechanism 11. After the plate 62 is disposed in the desired position, the nut 66 is tightened to lock the plate relative to the extension 56.

During the usual welding process, the work is viewed through the stationary transparent lens 18, the stationary, tinted, safety lens 24 and the slidable, dark welding lens 25, all of which are in registry with shield aperture 15 when the lens 25 is elevated to the position of FIG. 2.

When increased visibility is required, as for inspection of the work between welding "passes," the welding arc is, of course, extinguished, and the welder merely opens his jaws, thus depressing actuator C with relation to hood 10. This, as has been explained, acts through claws 46 to depress the distal ends 52 of the levers 50 and thereby, through the links 53, to depress the carrier 31 and its lens 25. The lens 25 is thus lowered below the direct line of sight of the welder, who now views the work only through the lenses 18 and 24, with the beneficial results spoken of above.

During the opening movement of the jaws, the chin moves through a slightly arcuate course and, were it not for the inclination or curvature of the slot 42, there would be a slight horizontal drag imposed on the chin plate 62, which, if imparted to the actuator C, as a whole, would tend to create binding forces sufficient to interfere with necessarily smooth, free descension of the carrier 31 and its lens 25. It is for this reason that slot 46 is curved or inclined with respect to the vertical, said slot being substantially arcuate, with its center of curvature approximately at the articulation point of the lower jaw of the average user when the hood 10 is applied to such a user. Therefore, as the lower jaw depresses the actuator C, the actuator may move slightly horizontally, though its major bodily movement is vertically downwardly, the curvature of neck 36 corresponding generally with that of slot 42, to allow for this horizontal component of movement. Thus, the horizontal component of lower-jaw opening movement does not set up the described, harmful binding conditions.

The limit of downward movement of the carrier 31 is established by the contact of the lower edge of carrier 31 with the lugs 55c on levers 50, as in FIGURE 3, though it could be established at some other point in the mechanism, as, for instance, by allowing the upper, end-defining wall 42a of the slot 42 to engage the pin 43 before the carrier 31 reaches the lugs 55c.

It will also be noted that, since levers 50 are of the third class, a given vertical movement of the slide member 34 results in a proportionately greater vertical movement of the filter lens 25, the movement-multiplying effect being amplified by the fact that the points of claw and lever engagement are much closer to the proximal ends of the levers than to the distal ends thereof. This movement multiplying effect is advantageous both from the standpoint that only relatively slight chin movement is required to depress the lens 25, and from the standpoint that less room need be provided within the hood 10 to accommodate the vertical movement of the actuator C.

When welding is to be resumed, the welder merely closes his jaws, and the spring 55 becomes effective, as has been described, to restore all parts of the device to the positions of FIGURES 1 and 2.

In assembling the hood 10, the frame 22 is bonded to the flattened portion 14 of the shield 9, as by bonding plugs 5 (FIG. 4) extending from flanges 16 to flanges 16a and through aligned holes 68 provided through the rolled flanges 32 and the corresponding marginal portions 5a of the frame 22, and through holes 68a in the upper, horizontal extent of the frame 22. It will be noted that, when the hood is so assembled, there are no moving parts on the exterior side of the hood 10. Moreover, the actuator C is the only moving part exposed on the interior side of the hood 10. The slidable lens 25, the levers 50, the connecting links 53, and the spring 55 are all enclosed between the frame 22 and the stationary lens 24 on one side, and by the flattened front portion 14 of the shield 9 and the transparent plate 18 on the other side. This is an important advantage of my improved hood in that the lens shifting mechanism 11 and the lens 25 are protected from interference by dirt and grit.

Although one embodiment of my invention has been illustrated and described, it will be understood that various changes in design, construction and arrangement may be made without departing from the spirit and scope of the appended claims.

I claim:

1. In a welder's hood having a vertical front section provided with a viewing aperture, a head harness secured to the hood and adjustable so that said aperture may be disposed in the wearer's line of vision, and a lens adapted to slide into and out of alignment with said aperture, mechanism for so sliding said lens; said mechanism including a chin-operable actuator embodying a slide member mounted on said hood for sliding movement in a substantially vertical plane, and a chin extension pivotally connected to said slide member for bodily movement with said slide member and for swinging movement relative to said slide member about a substantially horizontal axis, adjustable means accessible exteriorly of said hood for limiting the extent of swinging movement, in a downward direction, of said chin extension, a chin plate mounted on said chin extension, means on said chin extension and said chin plate accessible exteriorly of said hood for independently adjusting the horizontal spacing of said chin plate from said front section and the angular orientation of said chin plate with respect to said chin extension, a pair of levers pivotally mounted on said hood and operatively engaged by said slide member, said levers being operatively connected to said slidable lens in a manner whereby pivotal movement of said levers slides said lens.

2. In a welder's hood having a shield provided with a front portion with a viewing aperture and a lens mounted on said front portion for vertical reciprocation into and out of alignment with said aperture, mechanism for reciprocating said lens, said mechanism including an actuator embodying a slide member supported by the front portion of said shield for coincidental bodily vertical movement and relatively limited horizontal movement forwardly and rearwardly with respect to said shield, said slide member being provided with a slot inclined at a slight angle with respect to the vertical and extending downwardly and rearwardly relative to said front portion of said shield, a pin engageable in said slot, a stirrup, said pin and stirrup being carried by said shield, said pin, slot, and stirrup cooperating to guide said slide member rearwardly away from said front portion as said slide member moves bodily downwardly, chin-engageable means supported by said slide member, levers pivotally mounted on said hood and operatively associated with said slide member, said levers being operatively connected to said lens, whereby such coincidental bodily downward movement and rearward movement away from said front portion of said slide member pivotally swings said levers and thereby moves said lens out of alignment with said aperture.

3. In a welder's hood having a shield provided with a vertical front portion with inner and outer faces and with a viewing aperture, and a lens mounted on said front portion for reciprocation into and out of alignment with said aperture, mechanism for so reciprocating said lens; said mechanism including a chin operable actuator slidably mounted on the inner face of said front portion for movement between upper and lower limit positions, chin-engageable means on said actuator and movable therewith, guide means on said front portion and said actuator for guiding said chin-engageable means rearwardly away from said front portion during movement of said actuator from its upper toward its lower limit position, and means operatively connecting said lens and said actuator, whereby said lens is in alignment with said aperture in its upper limit position and out of alignment with said aperture in its lower limit position.

4. In a welder's hood, a shield having a flat front portion with inside and outside faces and provided with a viewing aperture, a head harness secured to said shield on the inside thereof and adjustable so that said viewing aperture may be positioned in the wearer's line of vision, a frame secured to the inside face of said front portion; a flat plate with front and rear surfaces and secured to said frame with its front surface disposed parallel to and spaced a small distance from said inside face, said frame and plate cooperating to define an aperture in register with the viewing aperture of said shield, a main filter lens slidably supported by said frame between said frame and said inside face for reciprocation into and out of register with said apertures, a chin operated actuator slidably mounted on the rear surface of said plate for vertical reciprocation with respect thereto, a pair of levers, each lever being disposed in the space between said plate and said inside face and pivotally connected at one of its ends to said plate, the proximal ends of said levers being adjacent one another, pivotal connections between the carrier and the distal ends of the levers, said pivotal connections being disposed in said space, a pair of pull-down claws on said actuator which extend forwardly through vertical slots in said plate to engage said levers at points intermediate their ends, whereby movement of the actuator in a downward direction pivotally swings said levers to move said lens out of alignment with said aperture, and a torsion spring disposed in said space and having its ends applied to the proximal ends of said levers, said spring urging said actuator in the opposite direction to move said lens into alignment with said apertures.

5. In a welder's hood having a shield provided with a vertical front portion with inner and outer faces and a viewing aperture, and a lens mounted on said front portion for reciprocation into and out of alignment with said aperture, mechanism for so reciprocating said lens; said mechanism including an actuator having upper and lower ends and slidably mounted on the inner face of said front portion for movement between upper and lower limit positions, guide means on said front portion and said actuator for guiding the lower end of said actuator rearwardly away from said front portion during movement of said actuator from its upper toward its lower limit position, chin extension pivotally connected to said slide member for bodily movement with said slide member and for swinging movement relative to said slide member about a substantially horizontal axis, means on said actuator adjacent its lower end forming a rearwardly facing shoulder, adjustment screw threadedly engaging said chin extension and extending generally parallel thereto, said screw being arranged at one end to abut said stop shoulder to adjustably limit the extent of swinging movement, in a downward direction, of said chin extension, means on said screw accessible exteriorly of said shield for rotating said screw, a chin plate mounted on said chin extension, means on said chin extension and said chin plate accessible exteriorly of said hood for independently adjusting the horizontal spacing of said chin plate from said front portion and the angular orientation of said chin plate with respect to said chin extension, and means operatively connecting said lens and said actuator, whereby said lens is in alignment with said aperture in its upper limit positions and out of alignment with said aperture in its lower limit position.

References Cited in the file of this patent

UNITED STATES PATENTS

| | | |
|---|---|---|
| 1,854,272 | Norton | Apr. 19, 1932 |
| 2,187,542 | Hagen | Jan. 16, 1940 |
| 2,354,502 | Cockrill et al. | July 25, 1944 |
| 2,384,798 | Conway | Sept. 18, 1945 |
| 2,386,656 | Carlson | Oct. 9, 1945 |
| 2,416,764 | Madson | Mar. 4, 1947 |
| 2,784,410 | Gentz | Mar. 12, 1957 |
| 2,896,215 | Fernandez | July 28, 1959 |